June 4, 1957 L. J. CHRISTENSEN ET AL 2,794,901
AUTOMATIC VERTICAL WELDER
Filed Feb. 15, 1955 4 Sheets-Sheet 1

Inventors:
Lynn J. Christensen,
Fred J. Jensen,
Darwin C. Christofferson,
By Merriam & Lorch, Attys.

Fig. 2.

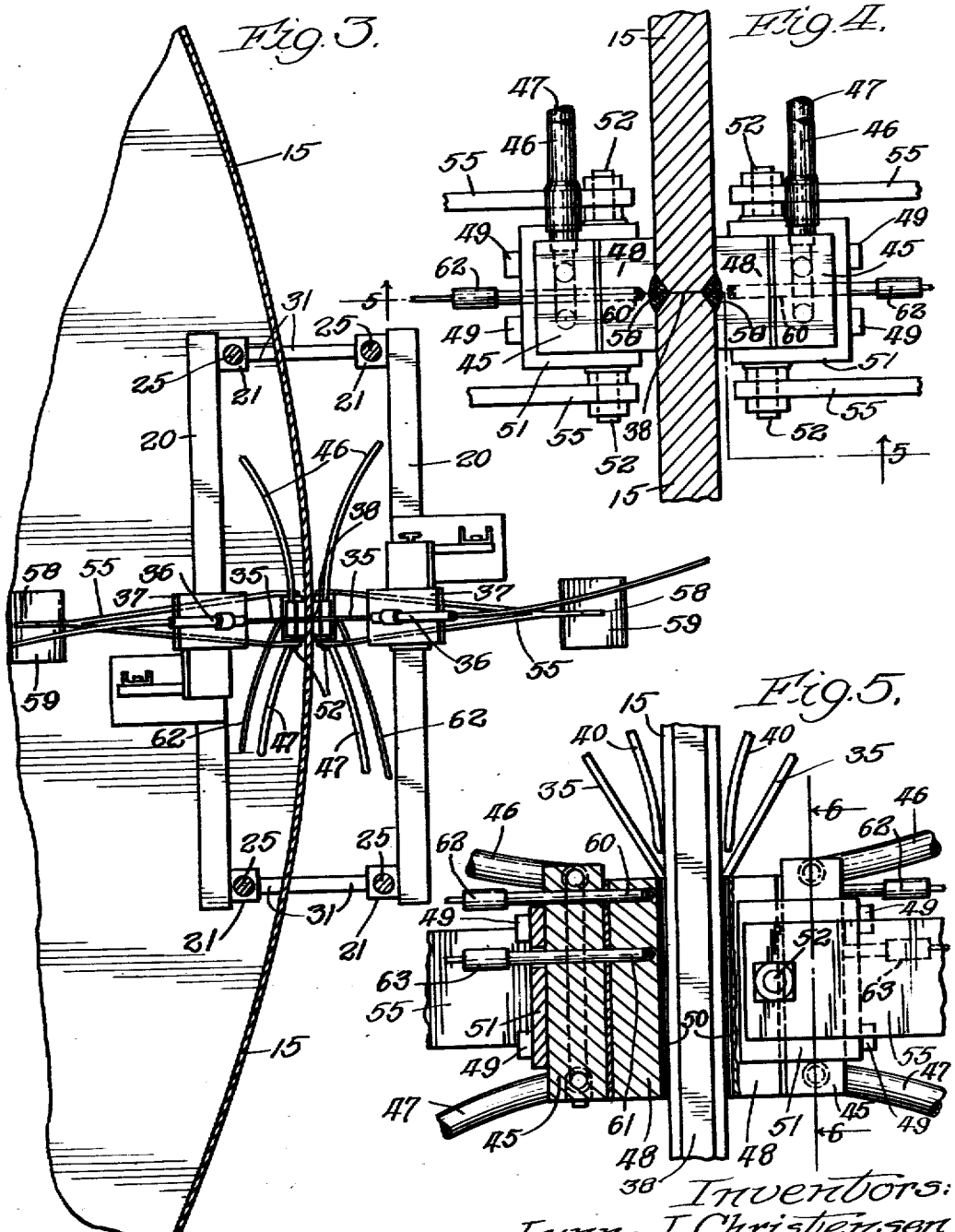

June 4, 1957     L. J. CHRISTENSEN ET AL     2,794,901
AUTOMATIC VERTICAL WELDER Filed Feb. 15, 1955     4 Sheets-Sheet 4

Inventors:
Lynn J. Christensen,
Fred J. Jensen,
Darwin C. Christofferson,
By Merriam & Lorch, Attys.

United States Patent Office 2,794,901
Patented June 4, 1957

2,794,901
AUTOMATIC VERTICAL WELDER

Lynn J. Christensen, Salt Lake City, Fred J. Jensen, Kearns, and Darwin C. Christofferson, Salt Lake City, Utah, assignors to Chicago Bridge & Iron Company, a corporation of Illinois Application February 15, 1955, Serial No. 488,308

11 Claims. (Cl. 219—126)

This invention pertains to welding and particularly to continuous and automatic welding of long vertical seams such as are encountered in the construction of large storage tanks, although obviously useful in other welding situations. The invention preferably involves the use of automatic arc welding and is especially adapted for use with the submerged arc welding process.

The welding of vertical seams presents peculiar problems, some not present in the welding of horizontal seams and others not present to such a marked degree. For example, there is a greater tendency in welding vertical seams for the molten material to flow from the seam or joint. The control of the temperature of the puddle is much more critical and, therefore, more difficult. Because of the foregoing, the skill of the operator has played a more important part in the welding of vertical seams as done heretofore, thus making uniformly homogeneous welds rather uncertain.

According to this invention, there is provided a supporting movable carriage adjustable along the upper edge of a tank under construction, for example, and support welding apparatus upon each side of the plates to be welded in position to weld the vertical seams upon a single continuous pass. The welding apparatus after being positioned over the vertical seam to be welded is automatically moved upward in a vertical direction to produce a continuous deposit of weld material in the vertical seam at a controlled rate of vertical travel and at a controlled temperature of the puddle through the use of an especially constructed mold, driving means therefor and control devices for the motor.

A more complete understanding will be had from the following detailed description of one embodiment of this invention when read in connection with the accompanying drawing in which:

Fig. 2 is a side elevation of the same showing a welding unit on each side of the tank plates;

Fig. 3 is a horizontal section taken along line 3—3 of Fig. 2;

Fig. 4 is an enlarged fragmentary horizontal view taken along line 4—4 of Fig. 2;

Fig. 5 is a vertical section taken along line 5—5 of Fig. 4;

Figure 1:
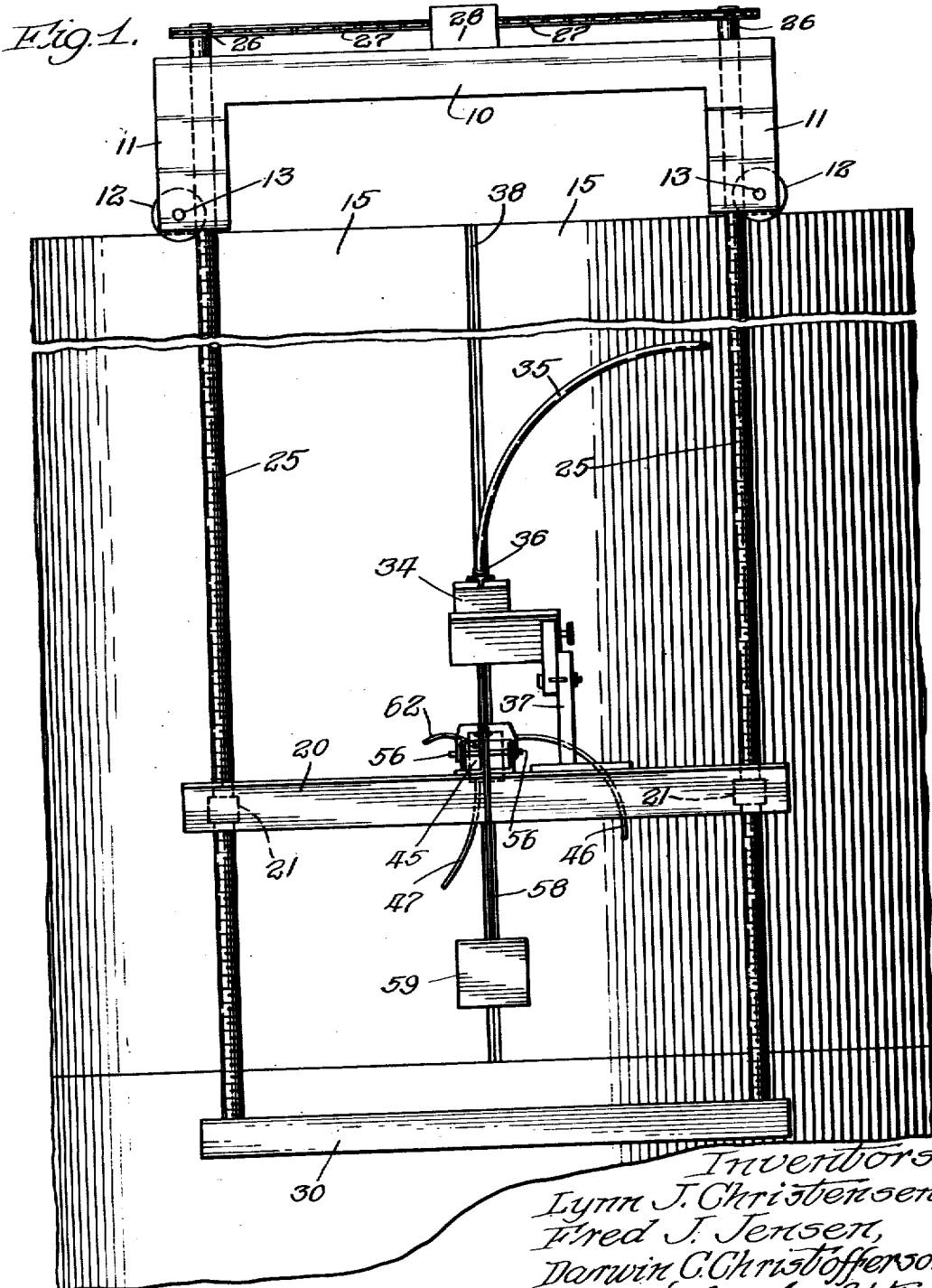
Fig. 1 is a front elevation of a vertical seam welding apparatus embodying one form of this invention as utilized in welding the vertical seams of vertically disposed plates of a tank under construction.
Figure 2:
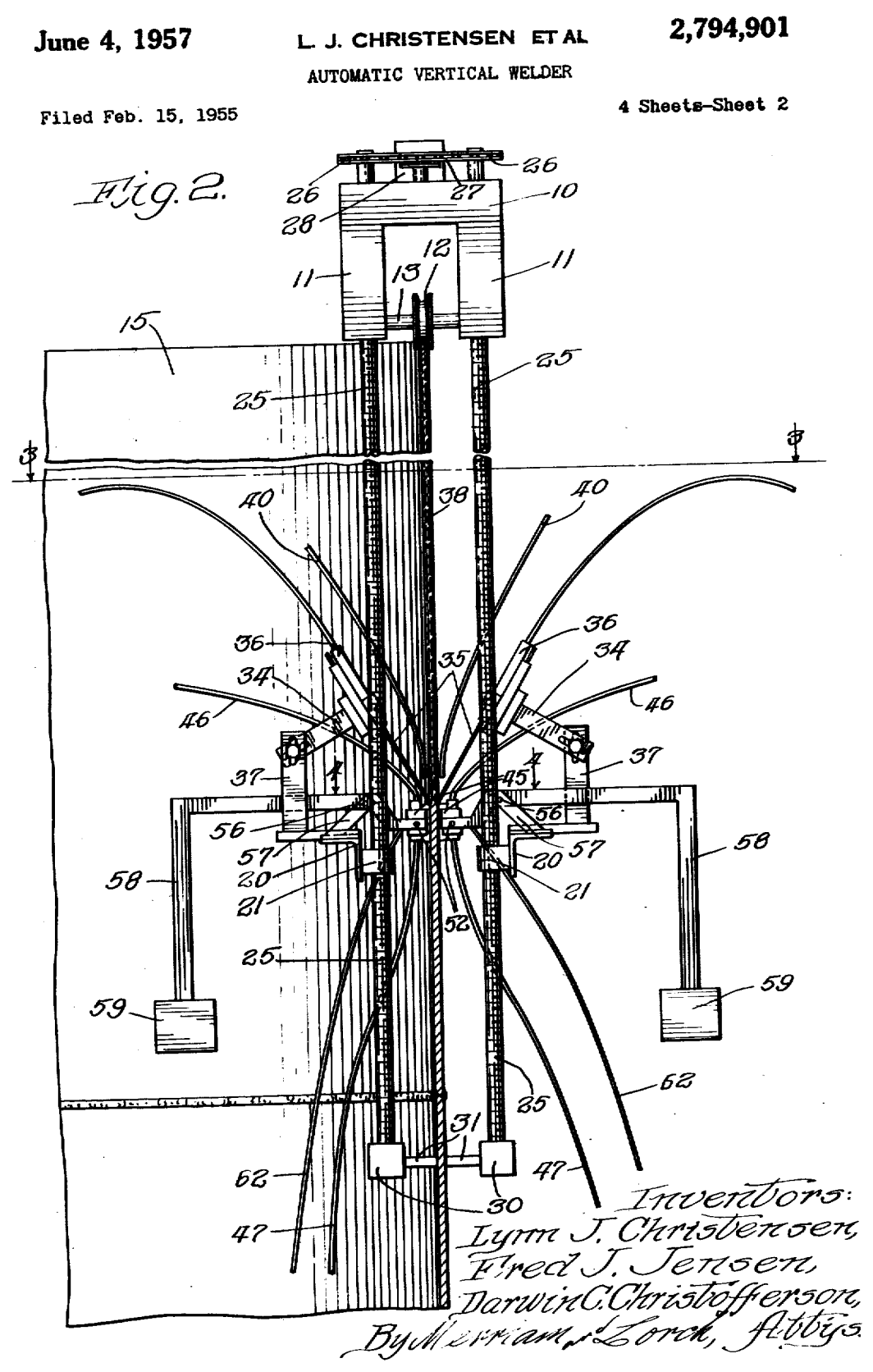
Figure 6:
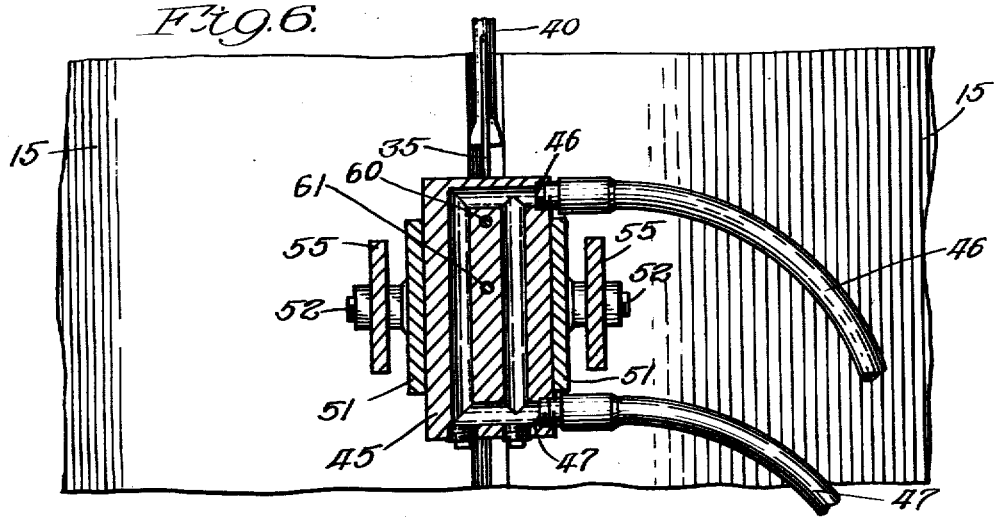
Fig. 6 is a vertical section taken along line 6—6 of Fig. 5.

Referring to the drawings and more particularly to Figs. 1 and 2, it will be seen that the entire welding apparatus is supported from a frame comprising an upper horizontal bar 10 and four spaced legs 11, there being two legs at each end of the bar 10. Between each pair of legs 11 at each end of bar 10 is a grooved roller 12 carried upon axles 13 extending between the legs. Rollers 12 are adapted to travel upon the upper edge of the shell plates 15 forming a tank or wall, which plates are to be welded so that the welding apparatus can readily be adjusted to a position over the vertical seam to be welded together.

The apparatus of this invention as described is particularly suitable for welding the vertical seams of the tank by a single pass. Accordingly, a pair of welding units are providede, i. e., one unit, the details of which will be described later, is supported upon each side of the shell plates from an angle bar 20 upon each side of the plates and to which threaded blocks 21 are attached adjacent each end. Blocks 21 threadedly engage four vertical screw posts 25, depending from the four legs 11, there being two posts upon each side of the shell plate.

The posts extend through the legs 11 and upper bar 10 and are restricted against vertical movement by any suitable means, such as collars (not shown), while permitted to rotate. At their upper ends, the posts are provided with sprockets 26 which are connected by chains 27 to a driving motor 28, resting on and secured to bar 10 in any suitable manner for rotating screws 25 and, thus, raising and lowering blocks 21, angle bars 20 and, accordingly, the welding units carried thereby.

The lower ends of posts 25 upon each side of the shell plates are journalled in lower frame members or bars 30 which keep the posts properly spaced in one direction while centering guides 31, threaded or otherwise secured to bars 30, maintain the screw posts at their proper distance from the shell plates.

The two welding units, i. e., one upon each side of the shell plate, are identical, therefore, only one will be described with the understanding that it is duplicated for the other side. Generally speaking, the welding unit includes means 34 for supporting and feeding an electrode wire 35 to a welding head 36 adjustably secured to a bracket 37 mounted on the angle bar 20 whereby the electrode is presented to the seam 38 between the plates 15. Such means normally include a motor operated electrode feed device, means for regulating the rate of feed( not shown) in response to variations in voltage across the welding zone and means for establishing the proper distribution of electrical energy to create an arc for accomplishing welding. The foregoing elements are not shown inasmuch as they are well known in the art and may be of any well-known manufacture, such as "Unionmelt" by way of example only.

The particular welding apparatus illustrated utilizes the well-known and so-called submerged arc method of welding in which the arc existing between the end of the electrode and the seam to be welded is completely covered by flux material. The flux is fed from any suitable hopper (not shown) through flux lines 40 to a point immediately ahead of the arc.

As previously stated, welding a vertical seam involves the particularly difficult problem of retaining the puddle of molten weld material in the groove of the seam and maintaining it at a consistent depth and at the best operating temperature. In the present invention, the puddle formed by the welding arc is retained at the proper level by the use of a sliding mold 45, fluid cooled, carried by each of the angle bars 20 so as to be moved vertically therewith and in contact with shell plates, i. e., one mold upon each side of the plates to dam the puddle of molten weld material as the molds move upwardly with progress of the weld. The two molds and their supporting mechanisms are identical, and, therefore, only one will be described.

The molds may be made of any suitable material, such as copper or brass, and are generally rectangular in form, cored or bored out to receive a cooling medium through inlet 46 and dischargeable through outlet 47. The mold is provided with a replaceable contact shoe 48 secured to the mold by cap screws 49, preferably with a sealing gasket between them. The shoe actually engages the shell plates and the cooling medium in the mold keeps the shoes and mold below melting temperature.

Thus, the wearing portion of the mold can be replaced readily and inexpensively. The contacting surface of the shoe is formed with a concaved portion 50 (Figs. 4 and 5) which overlies the seam and permits the formation of a puddle. The upper edge of the contact shoe is perpendicular to the contact surface so as to provide a sharp upper corner which prevents build-up of the flux or slag which would tend to force the shoe away from the plates if allowed to build up.

The mold is secured to a U-plate 51 by the cap screws 49, which U-plate is provided with trunnions 52 engaged by the arms of a yoke 55. Arms 55 extend outwardly and away from the shell plate and then angle upwardly where they are pivoted at 56 (Figs. 1 and 2) to an angle bracket 57 carried by the angle bar 20. The yoke arms then converge and extend further rearwardly and then downwardly as at 58 to provide a support for a suitable weight 59.

It will be apparent that the weight of the yokes plus any additional weights 59 will tend to rotate the yokes clockwise about pivots 56 and urge the molds 45 and thus their shoes 48 into close contact with the shell plates 15.

Figure 7:
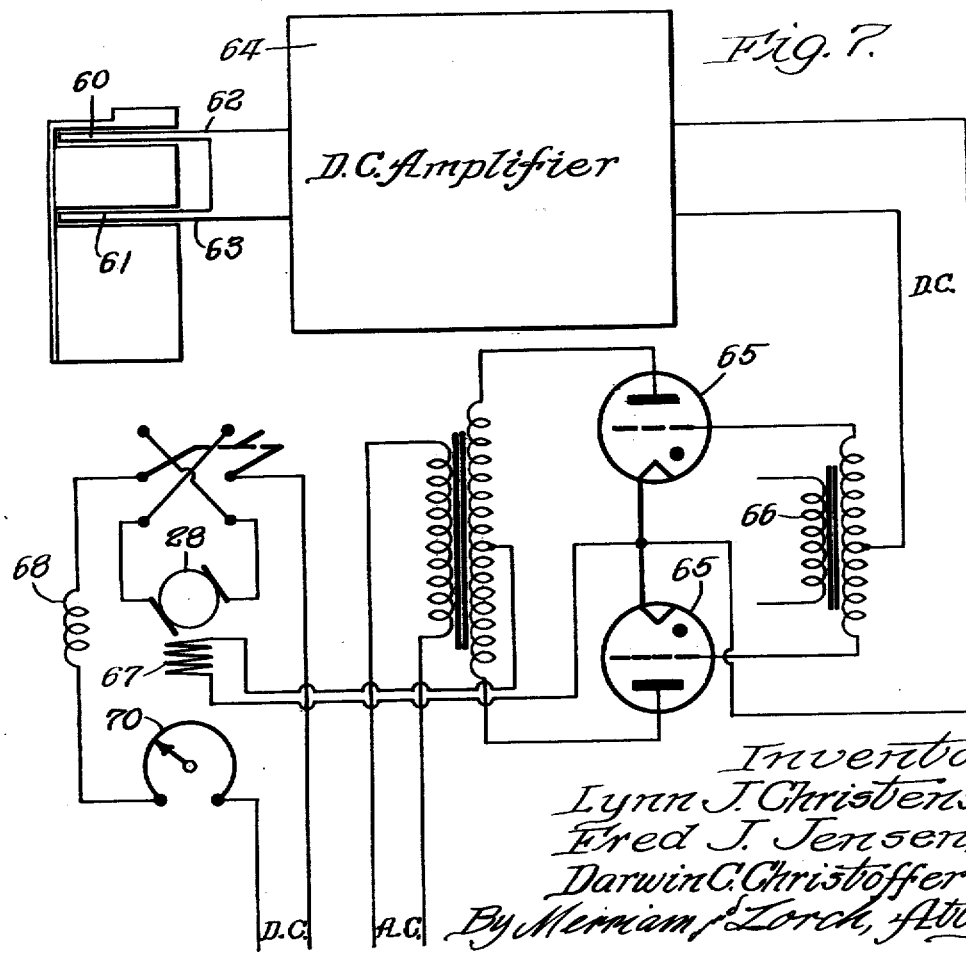
Fig. 7 is a schematic electrical diagram showing the electrical control system for the elevating or driving motor.

In the welding of vertical seams, the height of the puddle in the mold is not readily observable, yet, obviously, this level must be kept at a proper height for if too high, it will flow over, and if too low, the appearance and quality of the weld is affected. The height of the puddle depends in part on the travel of the mold. The rate of travel of the molds depends upon the speed of rotation of motor 28 which drives the screw posts 25, and the speed of motor 28 is controlled by the temperature of the mold as follows:

Each mold carries a pair of thermocouples 60 and 61 (Figs. 5 and 7), one (60) located approximately one half inch below the top of the mold and the other (61) one and one half inches below the top of the mold and having external connections 62 and 63, respectively, leading to a D. C. amplifier 64 which amplifies the difference in potential between the two voltages generated in the thermocouples and impresses this amplified differential voltage upon the grids of a pair of thyratrons 65 to which is also applied a constant A. C. rider voltage from transformer 66 in phase with the supply voltage. The plates of the thyratrons are connected to the shunt field 67 of the driving motor 28. The series field 68 of the motor includes the usual variable rheostat 70 for control of motor speed over wide variations. If desired, the thermocouples could be supported by brackets from the mold and in contact with the plates being welded and contiguous to the weld.

In operation, it is desired to maintain the welding puddle at a predetermined level with respect to the mold 45. Accordingly, the initial speed of the driving motor 28 is set to bring about the desired level by adjustment of the rheostat 70, and this speed is maintained thereafter by the above described apparatus under control of the thermocouples 61 and 62. That is, the speed of motor 28 and of the travel of the mold is such that the surface of the molten puddle is always between the two thermocouples.

The temperature difference between the two thermocouples varies if the puddle height varies. This differential is amplified and impressed upon the grids of the thyratrons. An increase in speed of the driving motor or a lowering of the puddle will cause the thyratron grids to become more positive, which in turn increases the output to the shunt field and reduces the motor speed. The armature circuit and field circuit may be made interchangeable if desired.

If the motor speed decreases, the opposite reactions take place, and, consequently, the motor tends to run at a constant speed once set and, thus, maintains a constant level of the puddle.

The operation of the entire apparatus in the field is rather apparent and exceptionally simple. The shell plates are secured together in edge to edge relationship by means of temporary apparatus, and the carriage is placed over the upper edge of the top plate with the welding unit at the lower end of a vertical seam. The arc electrode feed and flow of flux is started along with the driving motor 28. The heat generated by the arc on both sides of the joint or seam will melt out the center section of the plate so as to form a continuous puddle from one sliding mold to the other. Welds have been successfully produced on one and one fourth inch thick steel at six inches per minute vertical travel speed using 600 amperes (300 applied to each side). The speed of the driving motor is adjusted so that the trailing or bottom edge of the mold does not leave the welded seam until the metal has congealed sufficiently at least that it does not run out of the seam by reheating from the puddle.

Obviously, changes may be made in the details of construction by those skilled in the art without departing from the spirit and scope of the invention as defined in the appended claims.

We claim:

1. Apparatus for continuously welding a substantially vertical seam between adjoining plates, comprising: a carriage having means thereon for supporting it from said plates; a welding unit carried by said carriage; said unit having an electrode, a flux delivering means and a mold thereon for retaining a puddle of molten material; said carriage being adjustable horizontally along said plates, whereby said unit may be positioned at a vertical seam between adjoining plates; means supported from said carriage for supporting and guiding said unit for vertical movement along said seam to cause a continuous vertical weld to be made; motor means also supported from said carriage for positively moving said unit vertically and means for urging said mold into contact with the surface of said plates at the vertical seam therebetween during vertical movement of the mold.

2. An apparatus as defined in claim 1 wherein said mold has a removable shoe for contacting said plates.

3. An apparatus as defined in claim 2 wherein said removable shoe has a sharp upper edge adjacent said plates.

4. An apparatus as defined in claim 1 having means for controlling the vertical movement of said unit in accordance with the level of the molten weld material in said mold.

5. An apparatus as defined in claim 4 wherein said means for moving said unit vertically comprises an electric motor having a shunt field winding, and said controlling means regulates the effect of said shunt field.

6. An apparatus as defined in claim 4 wherein said control means comprises a pair of thermocouples in vertically spaced positions, contiguous to said vertical seam, means for moving said thermocouples at the same speed and in the same direction as the movement of said mold, and means responsive to the difference in voltage is generated in said thermocouples for controlling said vertical moving means.

7. An apparatus as defined in claim 4 wherein said control means comprises a pair of thermocouples in vertically spaced positions in said mold and means responsive to the difference in voltages generated in said thermocouples for controlling said vertical moving means.

8. An apparatus as defined in claim 1 wherein said mold is cooled by an extraneous source of coolant.

9. Apparatus for continuously welding a substantially vertical seam between adjoining plates, comprising: a carriage having means thereon for supporting it from said plates; a pair of spaced screw threaded posts depending from said carriage; a crossbar spanning and threadedly engaging said posts; a welding unit carried by said bar and having an electrode, a flux delivery means and a mold for retaining a puddle of molten material at said seam; means for simultaneously rotating said posts to raise said unit vertically along said seam to cause a continuous vertical weld to be made at said seam; and means for urging said mold into contact with said plates on both sides of said seam.

10. Apparatus for welding a substantially vertical seam between adjoining plates, comprising: a carriage, a welding unit supported by said carriage for vertical movement along a vertical seam and having an electrode, a flux delivery means and a mold for retaining a puddle of molten material at the seam, said carriage being adjustable horizontally along said plates, whereby said unit may be positioned at a vertical seam between adjoining plates, means for urging said mold into contact with the surface of said plates at the vertical seam therebetween during welding operation, and motor driving means for positively imparting vertical movement to said unit along said vertical seam.

11. An apparatus as defined in claim 10 wherein said mold has a removable shoe for contacting said plates.

UNITED STATES PATENTS

References Cited in the file of this patent

| | | |
|---|---|---|
| 2,241,572 | Armstrong | May 13, 1941 |
| 2,395,723 | Chmielewski | Feb. 26, 1946 |
| 2,638,524 | Meyer | May 12, 1953 |

UNITED STATES PATENT OFFICE

CERTIFICATE OF CORRECTION

Patent No. 2,794,901   June 4, 1957

Lynn J. Christensen et al.

It is hereby certified that error appears in the printed specification of the above numbered patent requiring correction and that the said Letters Patent should read as corrected below.

Column 2, line 11, for "providede" read --provided--; column 4, line 65, for "voltage is" read --voltages--.

Signed and sealed this 6th day of August 1957.

(SEAL)
Attest:
KARL H. AXLINE
Attesting Officer

ROBERT C. WATSON
Commissioner of Patents